(No Model.)
P. ARATA, G. BRUNELLI & L. ARATA.
WAGON JACK.
No. 552,344. Patented Dec. 31, 1895.
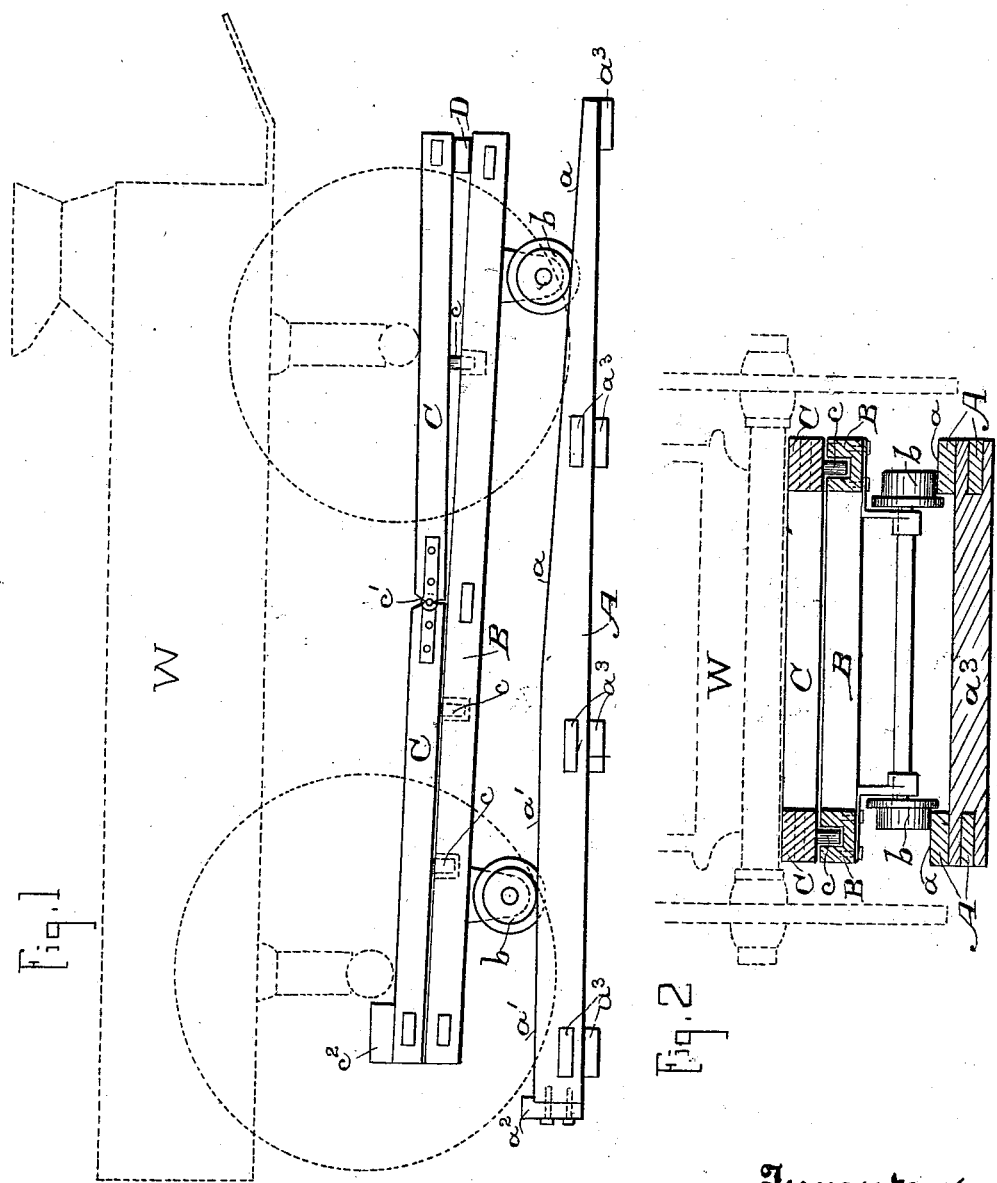
Witnesses,
Inventors,
Paolo Arata
Guglielmo Brunelli
Luigi Arata
By Dewey & Co.
attys

UNITED STATES PATENT OFFICE.

PAOLO ARATA, GUGLIELMO BRUNELLI, AND LUIGI ARATA, OF SAN FRANCISCO, CALIFORNIA, ASSIGNORS OF ONE-FOURTH TO PHILIP GIOVANNINI, OF SAME PLACE.

WAGON-JACK.

SPECIFICATION forming part of Letters Patent No. 552,344, dated December 31, 1895.

Application filed October 3, 1895. Serial No. 564,523. (No model.)

*To all whom it may concern:*

Be it known that we, PAOLO ARATA, a citizen of the United States, and GUGLIELMO BRUNELLI and LUIGI ARATA, citizens of Italy, all residing in the city and county of San Francisco, State of California, have invented an Improvement in Wagon-Jacks; and we hereby declare the following to be a full, clear, and exact description of the same.

Our invention relates to the class of wagon-jacks, and more especially to those wagon-lifting devices which are adapted to elevate the entire wagon from the ground, so that all its parts may be reached for washing, greasing, repairing, &c.

Our invention consists in an apparatus for this purpose comprising a base-frame, the upper surface of which is made on an incline, and a wheeled truck-frame adapted to freely pass under the wagon, and while still thereunder to roll up the inclined plane of the base-frame, whereby it is lifted up under said axles of the wagon and said wagon is elevated. In connection with the truck-frame is a novel equalizing or adjusting frame and other details of construction, all of which we shall hereinafter fully describe.

The object of our invention is to provide a simple and effective device for bodily raising a wagon, said device being capable of rapid use both in lifting and lowering the wagon.

Referring to the accompanying drawings, Figure 1 is a side elevation of our wagon-jack. Fig. 2 is a cross-section of same.

A is the base-frame. This in its best form is constructed of side pieces $a$ forming track-surfaces, which said surfaces are on an incline, except at their rear ends, as shown at $a'$, where they are continued in a horizontal plane and terminate in suitable stops $a^2$. These side pieces are suitably connected together, as by means of the cross-pieces $a^3$, which are mortised into them and extending down between them, project below them to form rests or supports.

B is the truck-frame. This is provided with wheels $b$ of a gage adapted to travel upon the track-surfaces $a$ of the base-frame. It will now be evident that if the truck-frame be resting upon the level ground beyond the base-frame and the wagon be rolled in over it and thereupon, if both wagon and truck-frame be rolled backwardly toward the base-frame, said truck-frame in traveling up the inclined planes of the base-frame will rise up under the axles of the wagon, and as it continues to move up the inclined plane will elevate said wagon and raise it clear off the ground, it being understood that both the base-frame and the truck-frame are narrower than the gage of the wagon, so that the wheels of the wagon are clear of both these parts.

The object of the horizontal portions $a'$ at the rear of the base-frame is to provide for a place of rest for the rear truck-frame wheels, so that when moved all the way back to the limiting-stops $a^2$, said wheels being upon the horizontal portions will be at a state of rest, and there will be no tendency for the truck-frame to roll down again, thus avoiding either in whole or in part the necessity for chuck-blocks under the truck-wheels. It is required, however, for the most perfect form of the apparatus that means be provided for further and more accurate adjustments than can be had by the truck-frame alone, and for this purpose we have removably fitted upon the top of the truck-frame, as by means of the dowel-pins $c$, the adjusting-frame C. This frame has side pieces and suitable cross-pieces, and it is made in two sections by reason of its side pieces being severed and hinged together, as shown at $c'$. The hinge at $c'$ is cut away at its top so as to permit the sections to be raised with respect to one another. On the rear end of the frame C is a stop-piece $c^2$.

The use of the complete device is as follows: The wagon W being run into proximity to the apparatus lies directly over the truck B with its adjusting-frame C, either by reason of being run over said truck or the truck run under it. Both wagon and truck are now run backwardly, as heretofore described, until the truck by moving up the inclined planes of the bed-frame rises under the axles, and the whole wagon is lifted, as before mentioned, its axles resting upon the adjusting-frame C. Now, in order to further adjust the wagon by lifting it either at one end or the other, or both, as may be desired, blocks, such as we have shown at D, are driven under the extremities or under either extremity of the adjusting-frame C, whereby they or either of them is raised. The usual adjustment will, of course, be at the forward end, as we have here shown, whereby the forward section of the adjusting-frame is raised, thereby lifting up the front portion of the wagon.

Having thus described our invention, what we claim as new, and desire to secure by Letters Patent, is—

1. A wagon-jack or lifting apparatus comprising a base frame, the upper surface of which is an inclined plane, and a movable truck frame adapted to pass under the wagon, and while still thereunder to run up on the inclined plane surface of the base frame, whereby the wagon is elevated.

2. A wagon-jack or lifting apparatus comprising a base frame, the upper surface of which is an inclined plane, terminating at its rear end in a horizontal plane, and a truck frame adapted to be moved under the wagon, and while still thereunder to be moved up the inclined plane of the base frame, and its rear wheels to find a rest upon the horizontal planes of said base frame, whereby the wagon is elevated and the parts held in a position of rest.

3. A wagon-jack or lifting apparatus comprising a base frame, the upper surface of which is an inclined plane, a truck frame and a supplemental adjusting frame on said truck frame, said truck frame and supplemental frame being adapted to be moved under the wagon, and while still thereunder to be run up on the inclined plane of the base frame whereby the wagon is elevated and may be adjusted by the adjusting frame.

4. A wagon-jack or lifting apparatus, comprising a base frame, the surface of which is an inclined plane, a truck frame and an adjusting frame on top of the truck frame, said adjusting frame consisting of two sections hinged together whereby either may be blocked up to finally adjust the wagon resting thereon.

5. A wagon-jack or lifting apparatus, comprising a base frame, the upper surface of which is an inclined plane terminating at its rear end in horizontal planes with a fixed back-stop, a truck frame adapted to travel up the inclined plane of the base frame, and to rest with its rear wheels upon the horizontal plane thereof and be limited by the back stop, and an adjusting frame on top of the truck frame, said adjusting frame being made in sections hinged together whereby said sections may be separately blocked up under the wagon, said adjusting frame having a back stop, all arranged substantially as herein described.

In witness whereof we have hereunto set our hands.

PAOLO ARATA.
GUGLIELMO BRUNELLI.
LUIGI ARATA.

Witnesses:
PHIL GIOVANNINI,
GEO. A. YOUNG.